April 2, 1935.  H. W. PITT  1,996,080
AUTOMATIC LUBRICATION SYSTEM
Filed July 2, 1929   2 Sheets-Sheet 1
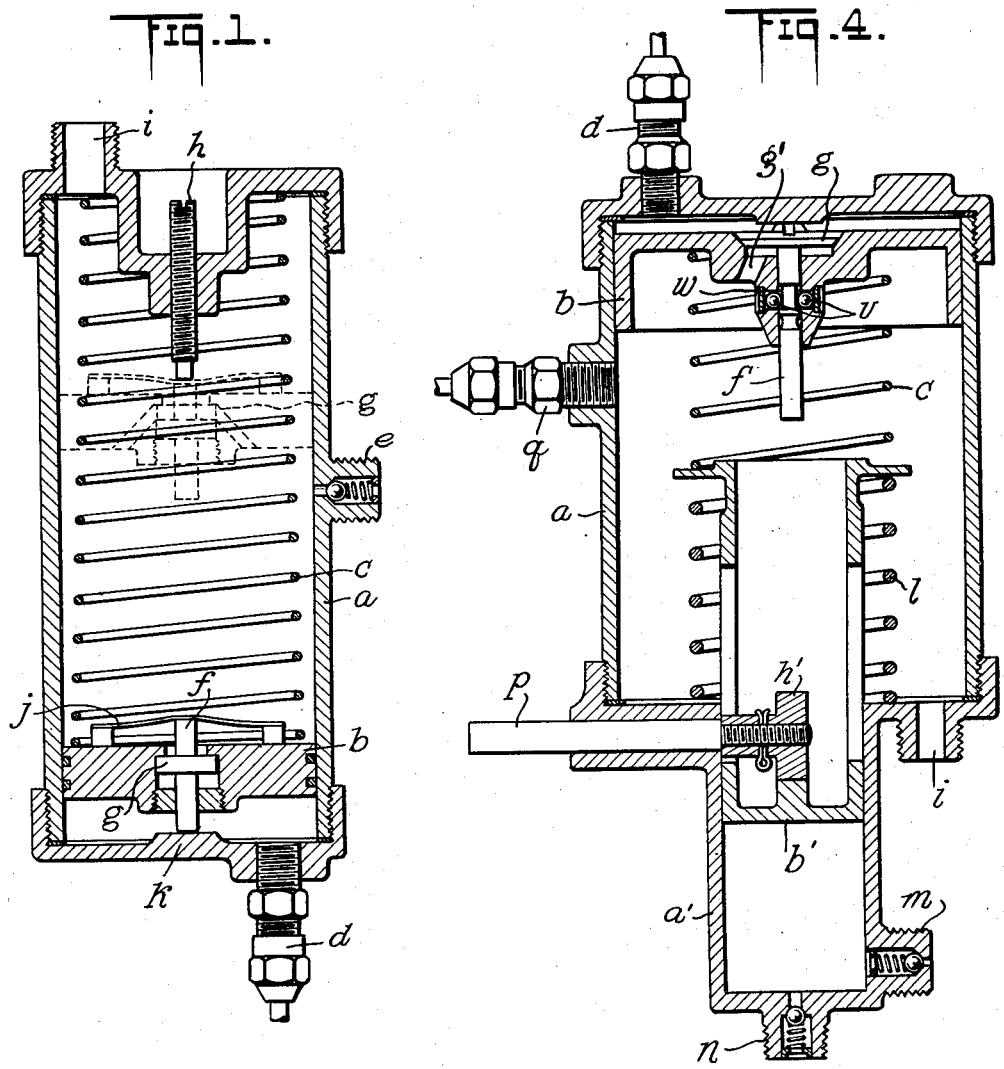
INVENTOR
Herbert Winchester Pitt
BY
his ATTORNEYS

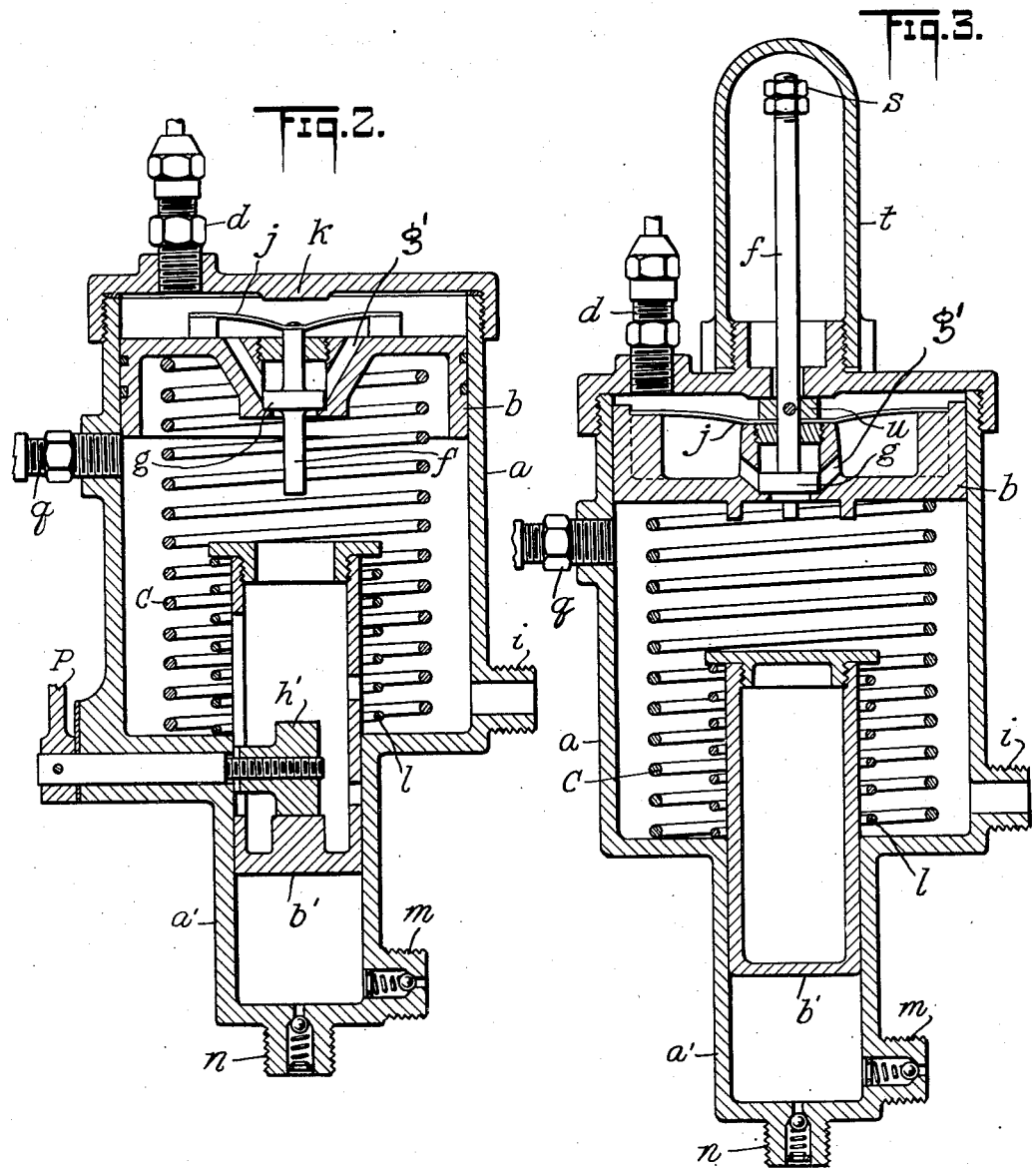

Patented Apr. 2, 1935

1,996,080

UNITED STATES PATENT OFFICE 1,996,080

AUTOMATIC LUBRICATION SYSTEM

Herbert Winchester Pitt, Acton, London, England

Application July 2, 1929, Serial No. 375,496
In Great Britain July 4, 1928

26 Claims. (Cl. 184—7)

This invention relates to automatic lubrication systems, and particularly those employed on motor vehicles.

The object of the invention is to provide means for intermittently supplying lubricant to the part or parts where lubricant is required from a source of supply, such as a pump or a reservoir under pressure and particularly a continuously acting source.

The invention comprises the employment between the source of oil supply and the distributing system, of fluid operated means which allow or cause oil to pass to the place of distribution or into the distributing system only during suitably timed intervals.

In particular the invention comprises the employment of a cylinder and piston or other pressure responsive device, and means under the control or operation of the piston for admitting or supplying oil intermittently to the place of distribution or the distributing system.

In the two accompanying sheets of explanatory drawings:—

Figures 1 to 4 illustrate by sectional elevations four different forms of apparatus constructed in accordance with this invention.

Referring to Figure 1 I arrange in the oil distributing system of a motor vehicle or other machine, or mechanical installation, a cylinder $a$ containing a piston $b$ which is subjected on one side to the pressure of a helical spring $c$ contained within the cylinder. Oil is supplied at a substantially constant rate or pressure from a pump or other continuously acting source, such as the engine oil pump, through one end of the cylinder at $d$. This oil acts on the side of the piston opposite to the spring. Preferably the oil is admitted at a slow rate through any convenient regulating device fitted with a non-return valve. These may be combined with the part $d$. As the capacity of the cylinder is comparatively large, the piston moves but slowly along the cylinder against the spring under the pressure of the oil. When the piston has moved through a convenient distance, for example, about half way along the cylinder, it uncovers an outlet connection $e$ containing a non-return valve and communicating with the distributing system or place of distribution. Oil can now flow from the cylinder to the parts to be lubricated.

Shortly after the piston has passed the outlet connection, the stem $f$ of a valve $g$ contained in the piston is arrested as shown by dotted lines, by contact with an adjustable stop $h$ projecting from the adjacent cylinder end, and in consequence the valve is opened, allowing oil to flow past it through ports $g'$ in the piston body previously covered by the valve to the opposite side of the piston whence it can return through an outlet $i$ in the cylinder end to the sump or reservoir, such as the engine oil pan, which supplies the pump. As the oil pressure on both sides of the piston is now equalized, the piston can return rapidly to its original position under the action of the spring $c$. To keep the valve open during the return movement, a suitable spring device, such as a bowed spring blade $j$ arranged to act like a toggle, is combined with the valve. When the piston reaches its upper position, this blade is deflected past a central or mean position, and remains in such position during the return of the piston. When the piston reaches its initial position the valve stem strikes an abutment $k$ on the adjacent cylinder end and causes the valve to close, the valve being held in the closed position by the spring $j$ which as shown is restored to its original position by the return of the valve. The cycle of operations is then repeated.

It will be apparent that by suitably regulating the rate of supply of oil to the cylinder and by suitably proportioning the various parts, the duration of the intervals in which oil is supplied to the distributing system, and the length of time between such intervals, can be suited to different requirements.

When it is desired to supply, for example, oil of a special quality to certain or all of the bearings, and retain the convenience of controlling the supply by other oil supplied by a continuously acting pump, two coaxial cylinders $a$, $a'$ are used as shown in Figures 2, 3 and 4, the one ($a$) being of preferably larger diameter than the other, and each contains a piston $b$, $b'$. The smaller piston $b'$ is preferably in the form of a hollow trunk which is closed at one end and is arranged to project into the larger cylinder. By the use of pistons of different diameters a larger pressure can be exerted on the oil supplied from the smaller cylinder $a'$ to the distributing system or to the bearings.

Referring to Figure 2, the smaller piston $b'$ is moved in one direction by a spring $l$, and during this movement oil is drawn into the smaller cylinder through a valve controlled inlet connection $m$. The larger piston moves, as in the first example, under the action of oil supplied by the pump. After the larger piston has moved from its initial position through a predetermined distance, against the action of its spring c, it engages the smaller piston and causes the latter to expel a quantity of oil through a valve controlled outlet n. Shortly afterwards the stem f of the valve g in the larger piston strikes an adjustable stop h' and the valve is opened, allowing the piston to be returned to its initial position by its spring. The stop h' in the form shown consists of a rotatable cam which can be adjusted by an external handle p. On reaching the initial position, the valve stem strikes the abutment k in the cylinder end and closes the valve in readiness for a repetition of the cycle of operations. During the return of the larger piston, the smaller piston is returned by its spring and a further quantity of oil is drawn into the smaller cylinder. If desired the speed of the downstroke of the larger piston may be augmented at or near the position at which it engages the smaller piston by the admission to the larger cylinder of a further supply of oil through a passage q which is then uncovered by the piston. Oil may be supplied to both inlets d, q from the same source. The outlet from a is indicated by i.

The construction shown in Figure 3 is essentially the same as that shown in Figure 2. It differs, however, in that the inner end of the piston b' is closed, and the regulation of the period at which the valve g is opened is controlled by an adjustable nut s on an extension of the valve stem, the extension being enclosed by a cover t. After the pistons b, b' have moved through a suitable distance, the nut s is arrested by contact with the upper cover of the cylinder a, causing the valve to open. On the return of the piston b the collar u on the valve stem is arrested by the cylinder cover and the valve is restored to its original position.

The construction shown in Figure 4 differs from that of Figure 2 mainly in the device for controlling the valve g. The valve stem f is grooved as shown and engaged by balls v which are held in position by a spring ring w. The valve is held in either of the limits of its movement by the action of the balls in the appropriate groove. Also the two springs c, l are arranged coaxially.

By this invention I am able to effect the automatic supply of oil to the bearings in proper quantity at suitable intervals in a very simple and reliable manner. The invention is not limited to the examples above described, nor to any subordinate mechanical details, as these may be varied to meet different requirements.

Having thus described my invention what I claim as new and desire to secure by Letters Patent is:—

1. In a lubricating installation, a substantially continuous source of lubricant pressure, an independent lubricant source of supply, a distributing system and an arrangement for forcing lubricant from said independent supply into said system actuated from said source, said arrangement comprising a relatively large cylinder, a relatively large piston therein, a relatively small cylinder, a relatively small piston therein, an inlet connection from said continuous source to said large cylinder on one side of said large piston, an outlet connection to said continuous source from said large cylinder on the other side of said large piston, a coil spring in said large cylinder biasing said piston in one direction, a port through said large piston, a valve associated with said port, a spring associated with said valve, means for operating said valve to open and close the port actuated upon movement of said large piston, a valved inlet connection from said independent source to one end of said small cylinder on one side of said piston, and a valved outlet connection from the same end of said small cylinder to said system, said small piston and said large piston, and said small cylinder and said large cylinder being so constructed and arranged that said small cylinder is concentrically positioned within one end of said large cylinder and upon the same axis as said large cylinder and so that said small piston is moved by direct connection with said large piston upon discharging through said valved outlet connection into the distributing system.

2. In combination, a lubricant pressure pump, a place of distribution, control means to regulate the flow of lubricant to said place from said pump, an inlet conduit from said pump to said control means, an outlet conduit from said control means to said place, said control means including a casing, reciprocatory means in said casing dividing it into a plurality of compartments, an inlet port from said inlet conduit into the one of said compartments serving as an inlet compartment, for supplying lubricant pressure to move said reciprocatory means in a forward direction, a spring stressed by said forward movement to cause a return movement of said means, relief means to relieve the lubricant pressure supplied from said inlet port to said inlet compartment after substantial forward movement of said reciprocatory means, whereby said spring will return said reciprocatory means, a return from said relief means to said pump, and means controlled by said reciprocatory means upon reciprocation thereof to supply lubricant to said outlet conduit and thereby to said place.

3. In combination, a fluid pressure and a lubricant supply means, a place of distribution, control means to regulate the flow of lubricant to said place from said supply means, an inlet conduit from said supply means to said control means, an outlet conduit from said control means to said place, said control means including a casing with an interior chamber, reciprocatory means in said casing dividing said chamber into a plurality of compartments, an inlet port from said inlet conduit into the one of said compartments serving as an inlet compartment, for supplying fluid pressure to move said reciprocatory means in a forward direction, a spring stressed by said forward movement to cause a return movement of said means, relief means to relieve the fluid pressure supplied from said inlet port to said inlet compartment after substantial forward movement of said reciprocatory means, whereby said spring will return said reciprocatory means, and means controlled by said reciprocatory means upon reciprocation thereof to supply lubricant to said outlet conduit and thereby to said place, said relief means including a return passage from said casing to said supply means and a passageway to connect said inlet compartment and said return passage provided with a valve, said valve being actuated to open said passageway when said reciprocatory means completes said forward movement, and to close said passageway upon completion of said return movement.

4. In combination, a fluid pressure and a lubricant supply means, a place of distribution, control means to regulate the flow of lubricant to said place from said supply means, an inlet conduit from said supply means to said control means, an outlet conduit from said control means to said place, said control means including a casing with an interior chamber, reciprocatory means in said casing dividing said chamber into a plurality of compartments, an inlet port from said inlet conduit into the one of said compartments serving as an inlet compartment, for supplying fluid pressure to move said reciprocatory means in a forward direction, a spring stressed by said forward movement to cause a return movement of said means, relief means to relieve the fluid pressure supplied from said inlet port to said inlet compartment after substantial forward movement of said reciprocatory means, whereby said spring will return said reciprocatory means, and means controlled by said reciprocatory means upon reciprocation thereof to supply lubricant to said outlet conduit and thereby to said place, said casing taking the form of a cylinder, said reciprocatory means taking the form of a piston closely fitting in said cylinder, and said relief means including a passageway through the piston provided with a valve and a return passageway establishing communication between the forward face of the piston and the supply means.

5. In combination, a fluid pressure and a lubricant supply means, a place of distribution, control means to regulate the flow of lubricant to said place from said supply means, an inlet conduit from said supply means to said control means, an outlet conduit from said control means to said place, said control means including a casing with an interior chamber, reciprocatory means in said casing dividing said chamber into a plurality of compartments, an inlet port from said inlet conduit into the one of said compartments serving as an inlet compartment, for supplying fluid pressure to move said reciprocatory means in a forward direction, a spring stressed by said forward movement to cause a return movement of said means, relief means to relieve the fluid pressure supplied from said inlet port to said inlet compartment after substantial forward movement of said reciprocatory means, whereby said spring will return said reciprocatory means, and means controlled by said reciprocatory means upon reciprocation thereof to supply lubricant to said outlet conduit and thereby to said place, said casing being provided with means to supply fluid pressure to the side of the reciprocatory means adjacent said inlet port after substantial movement of said reciprocatory means in a forward direction.

6. In combination, a fluid pressure and a lubricant supply means, a place of distribution, control means to regulate the flow of lubricant to said place from said supply means, an inlet conduit from said supply means to said control means, an outlet conduit from said control means to said place, said control means including a casing with an interior chamber, reciprocatory means in said casing dividing said chamber into a plurality of compartments, an inlet port from said inlet conduit into the one of said compartments serving as an inlet compartment, for supplying fluid pressure to move said reciprocatory means in a forward direction, a spring stressed by said forward movement to cause a return movement of said means, relief means to relieve the fluid pressure supplied from said inlet port to said inlet compartment after substantial forward movement of said reciprocatory means, whereby said spring will return said reciprocatory means, and means controlled by said reciprocatory means upon reciprocation thereof to supply lubricant to said outlet conduit and thereby to said place, said inlet port serving to continuously supply fluid pressure to the side of said reciprocatory means adjacent said inlet port, and said casing being provided with additional fluid pressure inlet means to supply fluid pressure to said same side of the reciprocatory means to augment the fluid pressure applied to said reciprocatory means when it is adjacent the end of its forward movement and before said relief means is actuated to relieve said fluid pressure.

7. In combination, a fluid pressure and a lubricant supply means, a place of distribution, control means to regulate the flow of lubricant to said place from said supply means, an inlet conduit from said supply means to said control means, an outlet conduit from said control means to said place, said control means including a casing with an interior chamber, reciprocatory means in said casing dividing said chamber into a plurality of compartments, an inlet port from said inlet conduit into the one of said compartments serving as an inlet compartment, for supplying fluid pressure to move said reciprocatory means in a forward direction, a spring stressed by said forward movement to cause a return movement of said means, relief means to relieve the fluid pressure supplied from said inlet port to said inlet compartment after substantial forward movement of said reciprocatory means, whereby said spring will return said reciprocatory means, and means controlled by said reciprocatory means upon reciprocation thereof to supply lubricant to said outlet conduit and thereby to said place, said relief means including a passageway through said reciprocatory means provided with a valve and stop means on the interior of said casing limiting the forward and return movements of the said reciprocatory means and actuating said valve to respectively open and close said passageway to cause return and forward movements of said reciprocatory means.

8. In combination, a fluid pressure and a lubricant supply means, a place of distribution, control means to regulate the flow of lubricant to said place from said supply means, an inlet conduit from said supply means to said control means, an outlet conduit from said control means to said place, said control means including a casing with an interior chamber, reciprocatory means in said casing dividing said chamber into a plurality of compartments, an inlet port from said inlet conduit into the one of said compartments serving as an inlet compartment, for supplying fluid pressure to move said reciprocatory means in a forward direction, a spring stressed by said forward movement to cause a return movement of said means, relief means to relieve the fluid pressure supplied from said inlet port to said inlet compartment after substantial forward movement of said reciprocatory means, whereby said spring will return said reciprocatory means, and means controlled by said reciprocatory means upon reciprocation thereof to supply lubricant to said outlet conduit and thereby to said place, the lubricant supplied to the outlet conduit consisting of the fluid supplied under pressure to the inlet compartment, and said last mentioned means controlled by said reciprocatory means including an outlet port in said casing to said outlet conduit, said outlet port being opened into said inlet compartment after substantial forward movement of said reciprocatory means, and closed after substantial return movement.

9. In a lubricating installation, a source of continuous hydraulic pressure, a flow controlling device and a conduit system leading from said device, said device comprising a cylinder, a piston movable within said cylinder dividing said cylinder into low and high pressure compartments and adapted to take forward and return strokes, an inlet port to supply said pressure to said high pressure compartment to cause said piston to make a forward stroke, a spring stressed by said piston upon forward stroke thereof to cause said piston subsequently to make a return stroke, an outlet port in the side of said cylinder to said conduit system, said piston serving alternately to establish and cut off communication between said inlet port and said outlet port during its forward and return strokes, and means for equalizing the pressure on both sides of the piston when it has taken a full stroke under pressure from said source to permit said spring to return said piston, said equalizing means being effective only during said return stroke.

10. In combination, a lubricant pressure pump and a lubricant supply means, a place of distribution, control means to regulate the flow of lubricant to said place from said supply means, an inlet conduit from said pressure pump to said control means, and an outlet conduit from said control means to said place, said control means including a casing, reciprocatory means in said casing dividing said casing into a plurality of compartments, an inlet port from said inlet conduit into one of said compartments serving as an inlet compartment, for supplying lubricant pressure to move said reciprocatory means in a forward direction, a spring stressed by said forward movement to cause a return movement of said means, relief means to relieve the lubricant pressure supplied from said inlet port to said inlet compartment after substantial forward movement of said reciprocatory means, whereby said spring will return said reciprocatory means, a return from said relief means to said pump, and intermittent supply means actuated by said reciprocatory means upon reciprocation thereof to intermittently supply lubricant to said outlet conduit and thereby to said place, said intermittent supply means including a cylinder, a piston in said cylinder adapted to take forward and return strokes upon actuation by said reciprocatory means, inlet and outlet ports to and from said cylinder, said inlet port being supplied with lubricant from said lubricant supply means and said outlet port receiving charges of lubricant under pressure upon forward strokes of said piston, said outlet port feeding said outlet conduit.

11. In a lubricating installation, a lubricant supply, a source of substantially continuous lubricant pressure, a distributing conduit system, a pump feeding lubricant from said lubricant supply to said distributing conduit system and means for operating said pump actuated by said source of continuous lubricant pressure, said last mentioned means including a casing, reciprocatory means in said casing dividing said casing into a plurality of compartments, an inlet port into one of said compartments serving as an inlet compartment for supplying lubricant pressure to move said reciprocatory means in a forward direction, a spring stressed by said forward movement to cause a return movement of said means, relief means to relieve the lubricant pressure supplied from said inlet port to said inlet compartment after substantial forward movement of said reciprocatory means, whereby said spring will return said reciprocatory means, and a return from said casing to said source for the lubricant which has passed through said relief means, and said reciprocatory means by its reciprocating movement actuating said pump.

12. In combination with a lubricating installation having a source of continuous lubricant pressure and a distributing system, means for intermittently connecting and disconnecting said source to and from said system respectively, comprising a casing, a reciprocating device within said casing, inlet and outlet connections respectively from said source and said system to said casing, said reciprocating device being so arranged in respect to said connections as to alternately cut off the outlet connection and permit communication between the inlet and outlet connections through said casing and said reciprocating device being actuated by said lubricant pressure from said source, said lubricant pressure being admitted to said casing through said inlet connection from said source, a spring stressed upon movement of said device under influence of said lubricant pressure and for biasing said device in a reverse direction upon relief of pressure and means for relieving the pressure upon said device including a return to said source and permitting return of said device by said spring when said device has completed its movement in one direction under the influence of said lubricant pressure.

13. In a lubricating installation, a lubricant supply, a source of lubricant pressure, a flow controlling device and a place of distribution, said device comprising a container, a pressure responsive device within said container, an inlet port to said container serving to admit lubricant pressure from said source to said device to move it to one end of its stroke, resilient means cooperating with said device to move it to the other end of its stroke, an outlet port from said cylinder to said place alternately closed and opened by said device during its movement and means for equalizing the pressure on both sides of the device when it has taken a full stroke under lubricant pressure from said source.

14. In combination, a pressure lubricant supply, a branched distributing piping system, and control means to regulate the flow of lubricant from said supply into said branched system, said control means including a casing, a pressure responsive device in said casing dividing said casing into low pressure and high pressure compartments, an inlet port from said lubricant supply into said high pressure compartment, whereby said lubricant pressure will move said pressure responsive device in a forward direction, a coil spring reacting against said pressure responsive device stressed by said forward movement to cause a return movement of said device, relief means to connect the high pressure and low pressure compartments when said device has completed its forward movement, whereby said spring will return said device, said relief means being effective only during return movement of said device and an outlet connection from said high pressure compartment to said branched system alternately opened and closed by reciprocatory movement of said device.

15. In combination, a source of lubricant pressure, a branched distributing piping system and a control means for regulating the flow from said source to said system, said control means including a cylinder, a piston in said device dividing the cylinder into a high pressure compartment and a low pressure compartment, an inlet connection from said source to the high pressure compartment, a return connection from the low pressure compartment to the source, a spring connected to said piston resisting movement of said piston to enlarge said high pressure compartment, a port through said piston connecting said high pressure and low pressure compartments, a valve controlling said port actuated into open position when said piston completes its movement to the low pressure end of the cylinder and actuated into closed position when said piston completes its return movement, said spring serving to return said piston when said port is opened and an outlet port to said system in the side of said cylinder alternately opened and closed in respect to said pressure source by said piston upon movement thereof.

16. In a lubricating installation, in combination with a source of fluid pressure, an independent source of lubricant supply, and a distributing piping system, a control device for regulating the flow of lubricant from said lubricant supply to said distributing piping system, said device comprising a relatively large reciprocating pressure responsive means with a low pressure side and a high pressure side, a relatively small pump actuated thereby, an inlet connection from the source of fluid pressure to the high pressure side of the pressure responsive device, a return connection to said source of fluid pressure from the lower pressure side of said pressure responsive device, means alternately to connect and disconnect said return connection respectively to and from said inlet connection actuated upon the completion of the movements of said pressure responsive device to the ends of its strokes, and a biasing spring stressed when said return connection is disconnected and serving to return said pressure responsive device when connection between said inlet and said return connection is established.

17. In a central lubricating installation, in combination with a source of hydraulic pressure, a lubricant supply and a branched distributing piping system; a control means for regulating the flow of lubricant from said supply to said system comprising a plurality of cylinders, a plurality of pistons, one in each cylinder, inlet and outlet ports for each cylinder, one of said cylinders being provided with a connection to its inlet port from said source and with relief and resilient means, whereby the piston thereof will take forward and return strokes and another cylinder having its piston actuated by the piston of said first mentioned combination to draw lubricant from said supply and expel it under pressure to said system through its inlet and outlet ports respectively, said source of hydraulic pressure consisting of a lubricant pump, the outlet port of said first cylinder affording a return from said cylinder to said pump.

18. In a lubricating installation, a source of lubricant pressure, a controlling valve and an outlet conduit from said valve to a place of distribution, said valve comprising a cylinder, a piston movable within said cylinder and dividing said cylinder into inlet and outlet compartments and adapted to take forward and return strokes, an inlet port to one side of said piston to supply said lubricant pressure thereto to cause said piston to make a forward stroke, a spring stressed by said piston upon forward stroke thereof serving to cause said piston subsequently to make a return stroke, an outlet port in the side of said cylinder to said outlet conduit, said piston serving alternately to establish and cut off communication between said inlet port and said outlet port during its forward and return strokes, and relief means to relieve the lubricant pressure in said inlet compartment serving to permit said spring to return said piston, automatically operated upon completion of said forward stroke and automatically disconnected upon completion of said return stroke.

19. In combination, a hydraulic pressure source, a lubricant supply, a place of use including bearing means receiving lubricant from said supply, a pump to regulate the flow of lubricant to said place from said supply, reciprocating means to actuate said pump, an inlet conduit from said source to said reciprocating means, and an outlet conduit from said pump to said place, said reciprocating means including a casing, a reciprocatory pressure responsive device in said casing dividing said casing into high and low pressure compartments, an inlet port from said inlet conduit into said high pressure compartment for supplying said hydraulic pressure to move said reciprocating device in a forward direction, a spring stressed by said forward movement to cause a return movement of said device, and relief means to relieve the pressure from said high pressure compartment into said low pressure compartment and permit return of said device under influence of said spring, said relief means being effective only during said return.

20. In a chassis lubricating installation, an independent lubricant supply, a source of continuous lubricant pressure including the engine oil pump and the crank case reservoir, a controlling device, a conduit system, and a pump feeding said system from said supply, said device actuating said pump and comprising a cylinder, a piston movable within said cylinder, and dividing said cylinder into high and low pressure compartments and adapted to take forward and return strokes, an inlet port to supply said engine oil pressure to the high pressure compartment to cause said piston to make a forward stroke, a spring stressed by said piston upon forward stroke thereof to cause said piston subsequently to make a return stroke, a return connection from said cylinder to said crankcase reservoir, and means for relieving the pressure in the high pressure compartment when the piston has taken a full forward stroke under lubricant pressure from said source, said relief of pressure serving to permit said spring to return said piston and effective only during said return stroke.

21. In a motor vehicle, in combination, an engine oil pump, a place of distribution, a control valve to regulate the flow of oil to said place from said pump, an inlet conduit from said pump to said control valve, and an outlet conduit from said control valve to said place, said control valve including a casing, a reciprocatory piston in said casing dividing said device into high and low pressure compartments, an inlet port from said inlet conduit into said high pressure compartment for supplying engine oil pressure to move said piston in a forward direction, a spring stressed upon said forward movement to cause a return movement of said piston, an outlet port to said outlet conduit controlled by said piston, and relief means to relieve the engine oil pressure supplied from said inlet port to said high pressure compartment actuated at completion of said forward movement and effective only until completion of said return movement.

22. In a central lubricating system, a flow controlling valve comprising a cylinder, a piston therein dividing said cylinder into high and low pressure compartments, a pressure inlet port into said high pressure compartment, an outlet port from said low pressure compartment, a port through said piston connecting said high pressure and low pressure compartments, a valve controlling said piston port actuated into open position when said piston completes its movement to the low pressure end of the cylinder and actuated into closed position when said piston completes its return movement, and a spring connected to said piston to return said piston when said piston port is opened, said inlet port receiving a supply of lubricant under pressure and said cylinder being also provided with a second outlet port adapted to feed lubricant toward a place of utilization, communication being alternately established and cut off by said piston during its movement.

23. In a central lubricating system, a flow controlling valve comprising a cylinder, a piston therein dividing said cylinder into two compartments, an inlet port into one of said compartments, an outlet port from the other compartment, a connecting port connecting said compartments, a valve controlling said connecting port actuated into open position when said piston completes its movement away from the inlet port end of the cylinder and actuated into closed position when said piston completes its return movement, and a spring connected to said piston to return said piston when said connecting port is opened, said inlet port receiving a supply of lubricant under pressure and said cylinder being also provided with a second outlet port adapted to feed lubricant toward a place of utilization, communication being alternately established and cut off by said piston during its movement.

24. In a lubricating installation, in combination with a source of lubricant pressure, and a place of use including bearing means, a control valve device for regulating the flow of lubricant from said lubricant source to said place, said device comprising a casing, a piston therein, an inlet connection from the source of lubricant pressure to one side of the piston, two outlet connections from said casing, means alternately to connect and disconnect said outlet connections in respect to said inlet connection actuated upon the reciprocation of said piston to the ends of its strokes, a biasing spring stressed upon movement of the piston in one direction, and means to cause said spring to return said pressure responsive device after completion of the movement in said one direction.

25. In a central lubricating installation, in combination with a source of hydraulic pressure, a lubricant supply and a branched distributing piping system; a control means for regulating the flow of lubricant from said supply to said system comprising two cylinders including pistons, one of said pistons being actuated in one direction by hydraulic pressure from said source, said second piston being actuated by said first piston to force lubricant from said supply into said system when said first piston is moved in said one direction, a spring connected to said first piston stressed during said movement in one direction and causing a subsequent return movement and means to enable return movement, said source of hydraulic pressure consisting of a lubricant pump, and said last mentioned means including a return from the cylinder of said first piston to said pump, said return being located in the cylinder on the side of said first mentioned piston in the direction of its movement in said one direction and a bypass through said first piston opened at the end of the movement of said first piston in said one direction and closed at the end of the return movement of said first piston.

26. In a lubricating installation, in combination with a source of lubricant pressure and a place of use including bearing means, a control valve device for regulating the flow of lubricant from said lubricant source to said place, said device comprising a casing, a piston reciprocating therein, an inlet connection from the source of lubricant pressure to one side of the piston, outlet connections from said casing, said outlet connections being alternately connected and disconnected to and from said inlet connection upon the reciprocating movement of said piston, a biasing spring serving to return said piston, said piston in its movement serving to connect and disconnect one of said outlet connections, by opening and closing said outlet connection, said outlet connection being in the side of the casing and being passed over by said piston in its reciprocation, whereby said outlet connection will be in communication with said inlet connection through said casing during one portion of the reciprocation of said piston and will be cut off by said piston in another portion of its reciprocation, the other outlet connection and the inlet connection being positioned throughout the reciprocation on opposite sides of said piston, and a passageway through said piston provided with means actuated by said piston at one end of its stroke away from said inlet connection to open said passageway to connect and at the other end of its stroke to close said passageway to disconnect the other outlet connection from said inlet connection.

HERBERT WINCHESTER PITT.